United States Patent
Dang et al.

(10) Patent No.: US 9,568,311 B2
(45) Date of Patent: *Feb. 14, 2017

(54) OPTICAL SYSTEM FOR SHAPING A LASER BEAM AND LASER SYSTEM HAVING SUCH AN OPTICAL SYSTEM

(75) Inventors: Lieu-Kim Dang, Gams (CH); Christoph Wuersch, Werdenberg (CH)

(73) Assignee: Hilti Aktiengesellschaft, Schaan (LI)

( * ) Notice: Subject to any disclaimer, the term of this patent is extended or adjusted under 35 U.S.C. 154(b) by 1274 days.

This patent is subject to a terminal disclaimer.

(21) Appl. No.: 13/333,613

(22) Filed: Dec. 21, 2011

(65) Prior Publication Data

US 2012/0327662 A1     Dec. 27, 2012

(30) Foreign Application Priority Data

Dec. 22, 2010  (DE) .................. 10 2010 063 938

(51) Int. Cl.
| | |
|---|---|
| G02B 13/06 | (2006.01) |
| G02B 27/09 | (2006.01) |
| G01C 15/00 | (2006.01) |
| G02B 19/00 | (2006.01) |

(52) U.S. Cl.
CPC ......... *G01C 15/004* (2013.01); *G02B 19/0028* (2013.01); *G02B 19/0052* (2013.01); *G02B 27/0927* (2013.01); *G02B 27/0944* (2013.01); *G02B 27/0977* (2013.01); *G02B 27/095* (2013.01)

(58) Field of Classification Search
CPC ... G02B 27/0172; G02B 27/09; G02B 27/095; G02B 13/06

USPC .......................................... 359/629–640, 725
See application file for complete search history.

(56) References Cited

U.S. PATENT DOCUMENTS

| | | | |
|---|---|---|---|
| 3,432,766 A | * | 3/1969 | Morantz .................... 372/70 |
| 4,111,564 A | | 9/1978 | Trice, Jr. |
| 5,764,828 A | | 6/1998 | Iga et al. |
| 7,497,018 B2 | | 3/2009 | Hersey et al. |

(Continued)

FOREIGN PATENT DOCUMENTS

| | | |
|---|---|---|
| DE | 696 15 148 T2 | 7/2002 |
| DE | 10 2009 000 590 A1 | 8/2010 |

(Continued)

OTHER PUBLICATIONS

Dang, Lieu-Kim; "Optical System for Shaping a Laser Beam and Laser System Having Such an Optical System" (25 pages); Appln. Filing Date—Dec. 21, 2011.

(Continued)

*Primary Examiner* — Scott J Sugarman
(74) *Attorney, Agent, or Firm* — Crowell & Moring LLP (57) ABSTRACT

An optical system for shaping a laser beam is disclosed. The system includes a first optical element that has a lateral surface which is designed as a reflecting surface for the laser beam, where the lateral surface reshapes the laser beam at least in some segments thereof into a ring-shaped laser beam. The at least segmentally ring-shaped laser beam propagates in a propagation plane. A further optical element is provided for shaping the ring-shaped laser beam that shapes the ring-shaped laser beam at least in some segments thereof in a plane parallel to the propagation plane of the laser beam.

14 Claims, 7 Drawing Sheets

(56) References Cited

U.S. PATENT DOCUMENTS

| 8,789,956 | B2 * | 7/2014 | Dang | G01C 15/004 |
|---|---|---|---|---|
| | | | | 359/558 |
| 2004/0107588 | A1 | 6/2004 | Pu | |
| 2005/0091859 | A1 | 5/2005 | Pu | |
| 2006/0091429 | A1 * | 5/2006 | Kim et al. | 257/257 |
| 2006/0109556 | A1 | 5/2006 | Guldevall | |

FOREIGN PATENT DOCUMENTS

| EP | 0 767 393 A2 | 4/1997 |
|---|---|---|
| EP | 1 296 163 A2 | 3/2003 |
| EP | 1 469 282 B1 | 10/2004 |

OTHER PUBLICATIONS

German Search Report, dated Aug. 22, 2011, 5 pages.
European Search Report dated Dec. 13, 2013 with Statement of Relevancy (Six (6) pages).

\* cited by examiner

OPTICAL SYSTEM FOR SHAPING A LASER BEAM AND LASER SYSTEM HAVING SUCH AN OPTICAL SYSTEM

This application claims the priority of German Patent Document No. 10 2010 063 938.9, filed Dec. 22, 2010, the disclosure of which is expressly incorporated by reference herein.

BACKGROUND AND SUMMARY OF THE INVENTION

The present invention relates to an optical system for shaping a laser beam and to a laser system having such an optical system.

On an incident interface, a laser beam is generally split into three parts: a first part is reflected at the interface (reflected laser beam), a second part passes through the interface into the second optical medium (transmitted laser beam) and a third part is absorbed at the interface (absorbed laser beam). An interface is defined as a surface that is arranged between two media of different refractive indices. An interface at which a laser beam predominantly passes from a first into a second optical medium is referred to as a transmitting surface. An interface at which a laser beam is predominantly deflected within an optical medium is referred to as a reflecting surface. The respective fractions of the reflected, transmitted and absorbed laser beam can be modified, for example, via the wavelength and/or the angle of incidence of the incident laser beam and/or via a coating of the interface.

U.S. Pat. No. 7,497,018 discloses a laser system in which a spot-shaped laser beam is reshaped by means of an optical system into a laser beam that is ring-shaped at least in some segments thereof. The laser system includes a housing, and a beam device arranged within the housing that comprises a beam source for generating a laser beam and the optical system. The optical system comprises a first optical element and a second optical element that is designed as a collimating lens, the optical elements being arranged in an optical mount. The beam source generates a divergent primary laser beam that impinges on the collimating lens which collimates the primary laser beam and generates a parallel laser beam. The collimated laser beam impinges on the first optical element which is arranged downstream from the collimating lens in a propagation direction and is designed as a conical mirror. A conical mirror is a reflective optical element that is designed at least in some segments thereof in the shape of a cone having a base and a lateral surface abutting the base. The lateral surface of the conical mirror is designed as a reflecting surface at which the collimated laser beam is deflected through 90° and reshaped into a laser beam that is ring-shaped at least in some segments thereof.

The known optical system for shaping a laser beam generates on a target surface a line-shaped laser mark. A shortcoming lies in that the optical system is not suitable to display in the laser plane, in addition to the line-shaped laser mark, also spot-shaped laser marks, which are suited, for example, for transferring right angles.

The aim of the present invention is to develop an optical system and a laser system having such an optical system, in which it is possible, in addition to displaying a line-shaped laser mark, to transfer angles from one target surface onto another target surface.

According to the present invention, a further optical element for shaping the at least segmentally ring-shaped laser beam is provided, the further optical element shaping the ring-shaped laser beam at least in some segments thereof in a plane parallel to the propagation plane. This embodiment has the advantage in that it is possible to generate spot-shaped laser marks on a target surface in addition to a line-shaped laser mark that the ring-shaped laser beam generates on the target surface. If two spot-shaped laser marks are arranged at a specified angle to one another, the angle can be transferred with the aid of the two spot-shaped laser marks from one target surface onto another target surface.

In a preferred embodiment, the further optical element for shaping the at least segmentally ring-shaped laser beam is integrated into the lateral surface of the first optical element or directly abuts the lateral surface. This embodiment has the advantage that the alignment of the optical elements relative to each other takes place during manufacturing of the optical system, rather than at a later time, and only one optical mount is required. The alignment effort required on the part of the user is reduced.

In a further preferred embodiment, the first optical element comprises a first lateral surface segment that generates the at least segmentally ring-shaped laser beam, and the further optical element comprises a second lateral surface segment, the second lateral surface segment abutting the first lateral surface segment. The first optical element is assembled from a plurality of segments that abut one another. In this arrangement the segments are selected such that they have the desired beam-shaping properties; a first segment produces a ring-shaped laser beam and a second segment produces a spot-shaped laser beam.

In a further preferred embodiment, a further optical element having at least one interface is provided, wherein the optical element for shaping the ring-shaped laser beam in a plane parallel to the propagation plane is integrated into the at least one interface, or directly abuts the at least one interface. Owing to the optical element for shaping the ring-shaped laser beam in a plane parallel to the propagation plane being integrated into an existing interface, alignment of the optical elements relative to each other takes place during manufacturing of the optical system, rather than at a later time; an additional optical mount is not required.

Particularly preferable, a further optical element for shaping the at least segmentally ring-shaped laser beam in a plane perpendicular to the propagation plane is provided, wherein the further optical element is integrated into the at least one interface or directly abuts the at least one interface. This embodiment has the advantage that a narrow line-shaped laser mark can be generated on the target surface. The ring-shaped laser beam is shaped, for example, with the aid of collimating optics or focusing optics. Owing to the further optical element being integrated into an existing interface, the alignment of the optical elements relative to each other takes place during manufacturing of the optical system, rather than at a later time; an additional optical mount is not required. The alignment effort required on the part of the user is reduced.

The optical element for shaping the ring-shaped laser beam in a plane parallel to the propagation plane and/or the further optical element for shaping the ring-shaped laser beam in a plane perpendicular to the propagation plane are designed preferably as diffractive optical elements, and are integrated into the lateral surface of the first optical element and/or into the at least one interface of the further optical element. Diffractive optical elements shape a laser beam in such a way that the zero order of diffraction of the laser beam generates a line-shaped laser mark on the target surface and the higher orders of diffraction; in particular the first order of diffraction, generate spot-shaped laser marks. An incident laser beam can be shaped with the aid of a diffractive optical element into nearly any desired beam distribution.

The optical element for shaping the ring-shaped laser beam in a plane parallel to the propagation plane and/or the further optical element for shaping the ring-shaped laser beam in a plane perpendicular to the propagation plane are preferably designed as ground optical elements. Spot-shaped laser beams can be collimated or focused by beam shaping optics. The beam shaping optics can be integrated into the ground optical elements via a curved incident surface.

In a preferred embodiment, the first optical element is designed as a base member having a lower base, an upper base, and a lateral surface abutting the lower and upper bases, wherein the lower base and the lateral surface are designed at least in some segments thereof as transmitting surfaces for the laser beam; the base member has a first cutout portion comprising a base that is arranged in the upper base of the base member and the lateral surface which is designed at least in some segments thereof as a reflecting surface for the laser beam. This embodiment has the advantage that only one optical mount is needed and that the alignment of the two optical elements relative to each other takes place during manufacturing of the optical system. The embodiment of the base member that has two transmitting surfaces offers the advantage that additional functions can be integrated into the base member or designed so as to directly abut the base member.

Particularly preferable, the base member has a second cutout portion comprising a lower base which is arranged in the lower base of the base member, an upper base which is designed at least in some segments thereof as a transmitting surface for the laser beam, and a lateral surface abutting the lower and upper bases which is designed at least in some segments thereof as a reflecting surface for the laser beam. The optical system thus has a first and a second reflecting surface for the laser beam, wherein the lateral surface of the first cutout portion arranged in the upper base forms the first reflecting surface, and the lateral surface of the second cutout portion arranged in the lower base forms the second reflecting surface. Owing to the double reflection of the laser beam, the optical system according to the invention is not sensitive to a tilting of the reflecting surface relative to the incident laser beam. Since the second reflecting surface is likewise integrated into the base member of the optical element, only one optical mount is needed and the alignment of the first and second reflecting surface relative to each other takes place during production of the first and second cutout portion in the base member.

Particularly preferably, the first cutout portion of the base member has an upper base that is parallel to the lower base, which upper base is designed at least in some sections thereof as a transmitting surface for the laser beam. This embodiment has the advantage that a spot-shaped plumb beam is generated in addition to the ring-shaped laser beam. The beam shape of the plumb beam can be adjusted via an optical element that is integrated into or directly abuts the upper base. A collimated or focused plumb beam can be generated by collimating or focusing optics.

Also provided is a laser system comprising a beam source for generating a laser beam and comprising the optical system according to the invention. Preferably, an adjustment device is provided whereby the position of the beam source relative to the optical system and/or the position of the optical system relative to the beam source are adjustable in a propagation direction of the laser beam and/or in a plane perpendicular to the propagation direction of the laser beam.

In a preferred embodiment of the laser system there is provided a first optical system which produces a first at least segmentally ring-shaped laser beam and at least one spot-shaped laser beam, and at least one further optical system which produces a further at least segmentally ring-shaped laser beam and at least one spot-shaped laser beam.

Particularly preferred is a third optical system which produces a third at least segmentally ring-shaped laser beam and at least one spot-shaped laser beam. The ring-shaped laser beams are arranged perpendicular to one another or at a specified angle.

In a further preferred embodiment of the laser system, at least one optical system is designed in such a way that in addition to an at least segmentally ring-shaped laser beam and at least one spot-shaped laser beam, both of which extend in the same propagation plane, a spot-shaped plumb beam is produced.

Embodiments of the invention will be described below with reference to the drawings. The drawings are not necessarily intended to show the embodiments true to scale, but instead the drawings are rendered, where expedient for explanation purposes, in schematic and/or slightly distorted form. With regard to teachings readily apparent from the drawings, reference is hereby made to the pertinent prior art for further details. One should bear in mind that a great variety of modifications and changes can be made with respect to the form and detail of an embodiment without departing from the general idea of the invention. The features of the invention that are disclosed in the description, in the drawings and in the claims may be essential for further enhancement of the invention, by themselves and/or in any combination thereof. Furthermore, the scope of the invention also covers any and all combinations of at least two of the features disclosed in the description, in the drawings and/or in the claims. The general idea of the invention is not limited to the exact form or detail of the embodiments shown and described hereinbelow, nor limited to a subject matter that would be limited when compared to the subject matter as claimed in the claims. Where dimensional ranges are given, values that lie within the stated limits shall be usable and claimable also as threshold values. For reasons of simplicity, like reference symbols are used hereinbelow for identical elements or similar elements of identical or similar function.

DETAILED DESCRIPTION OF THE DRAWINGS

Figure 1:
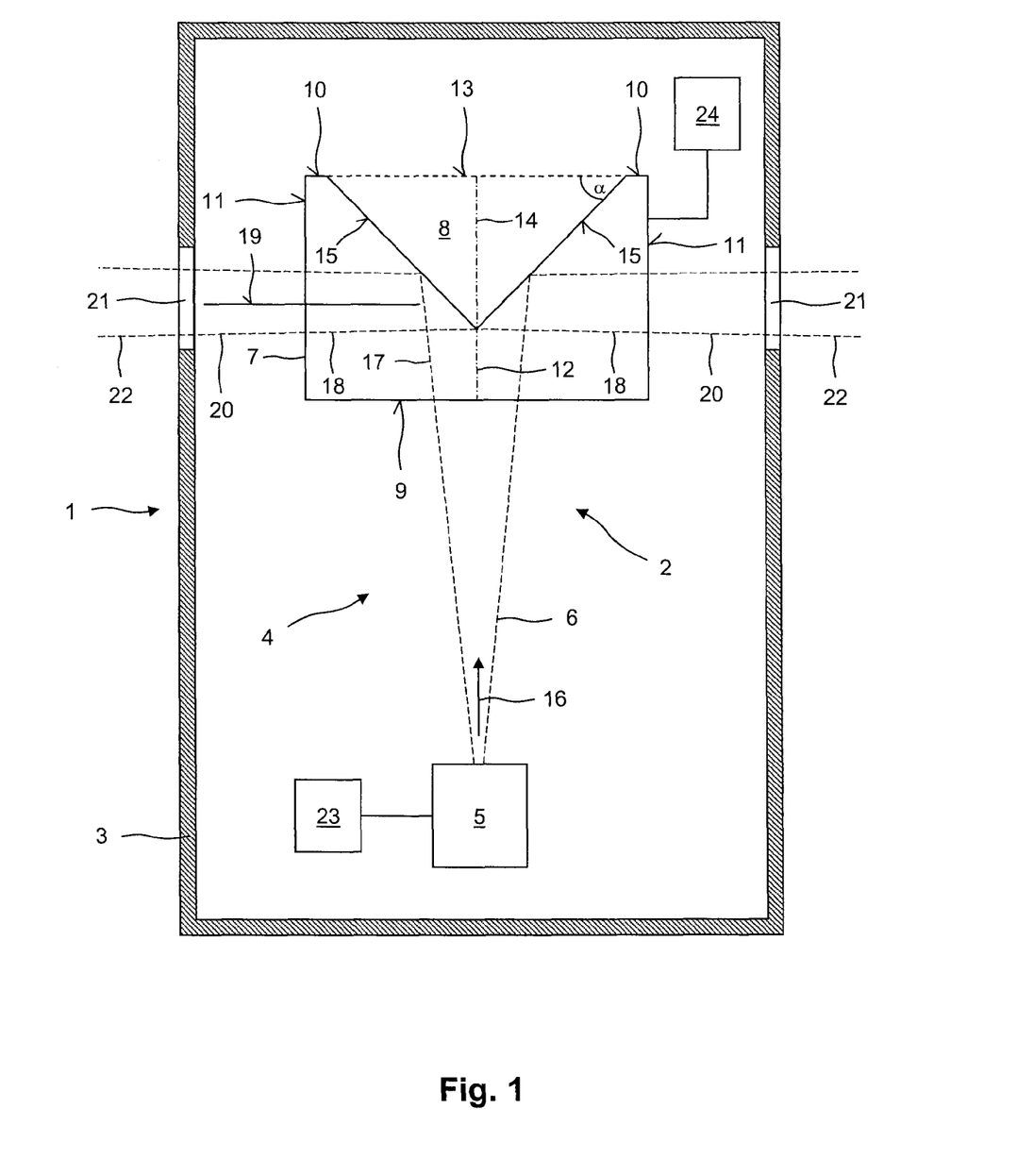
FIG. 1 shows a laser system having a first embodiment of an optical system according to the invention, comprising a cylindrical base member that has a cone-shaped cutout portion in the upper base of the base member.

FIG. 1 shows a laser system 1 comprising a first embodiment of an optical system 2 according to the invention. The laser system 1 includes a housing 3 and a beam device 4 arranged in the housing 3, the beam device comprising the optical system 2 and a beam source 5.

The beam source 5 is designed as a semiconductor laser that generates a primary laser beam 6 in the visible spectrum, for example a red laser beam having a wavelength of 635 nm or a green laser beam having a wavelength of 532 nm. Following emission of the primary laser beam 6 from the laser source 5, the divergence that takes place results in an expansion of the laser beam 6, that is to say, the beam diameter of the primary laser beam 6 increases in proportion with the distance of the laser beam from the beam source 5. With the aid of collimating optics, a laser beam can be collimated.

Arranged in the optical path downstream of the beam source 5 is the optical system 2 according to the invention. The optical system 2 is designed as a base member 7 in the form of a right circular cylinder having a cone-shaped cutout portion 8. A circular cylinder is a cylinder that has a circular base. A cylinder is bounded by two parallel, flat surfaces that are referred to as the lower and the upper base, and by a lateral surface. A cylinder is obtained by displacing a bounded surface lying in a plane along a straight line which does not lie in the plane and which defines the cylinder axis. In a right cylinder the cylinder axis extends perpendicular to the base, whereas the cylinder axis in an oblique cylinder is arranged at an angle of ≠90° relative to the lower base. The distance between the two planes in which the lower and upper bases lie defines the height of the cylinder.

The surface of the circular cylinder 7 includes a circular lower base 9, a circular upper base 10 parallel to the lower base 9, and a lateral surface 11 that connects the lower and upper bases 9, 10. The lower and upper bases 9, 10 are arranged perpendicular to, and the lateral surface 11 parallel to, a cylinder axis 12. The lower base 9 and the lateral surface 11 of the circular cylinder 7 each form an interface between the optical system 2 and the surrounding environment, which interfaces are designed as transmitting surfaces for the laser beam 6. The transmitting surfaces 9, 11 are referred to also as the incident surface 9 and the emergent surface 11 for the laser beam.

The cutout portion 8 provided in the base member 7 is designed as a right circular cone. A circular cone is a cone that has a circular base. As a rule, a cone is a geometric object which is obtained when all points of a bounded surface lying in a plane are connected by straight lines to a point which lies outside the plane. The surface is referred to as the base, the bounding line of the base as the directrix, and the point as the cone vertex. The distance of the cone vertex from the base defines the height of the cone. The lines connecting the cone vertex to the directrix are referred to as the generatrices and the locus of the generatrices is referred to as the lateral surface of the cone. In a right cone that has a circular base the cone vertex lies on the cone axis that extends perpendicular to the base through the center point of the base, whereas the cone axis in an oblique circular cone extends outside the center point of the base.

The surface area of the cone-shaped cutout portion 8 comprises a circular base 13 that is arranged perpendicular to a cone axis 14, and a lateral surface 15 that abuts the base 13 and is arranged at an angle α to the base 13. The base 13 of the cone-shaped cutout portion 8 is arranged on the upper base 10 of the circular cylinder 7, and the cone axis 14 extends co-linear with the cylinder axis 12.

The lateral surface 15 of the cone-shaped cutout portion 8 forms an interface between the optical system 2 and the surrounding environment, which interface is designed as a reflecting surface for the laser beam 6. The reflectivity of a reflecting surface depends, among other things, on the angle of incidence of an incident laser beam and on the refractive indices $n_1$, $n_2$ of the materials. In order for a laser beam to be reflected at the lateral surface 15 as fully as possible, the angle of incidence should fulfill the condition of total reflection, wherein the angle of incidence≥arcsin $(n_1/n_2)$. The reflected fraction can alternatively or additionally be increased by providing the reflecting surface 15 with a highly reflective coating.

The divergent laser beam 6 propagates in a propagation direction 16 and impinges on the incident surface 9, through which the transmitted fraction passes as transmitted laser beam 17. The transmitted laser beam 17 propagates through the base member 7 and impinges on the reflecting surface 15 which deflects the reflected fraction and reshapes it into an at least segmentally ring-shaped laser beam 18. The ring-shaped laser beam 18 propagates in a propagation plane 19 and impinges on the emergent surface 11, through which the transmitted fraction passes as transmitted laser beam 20 and continues to propagate in the propagation plane 19. At the emergent surface 11 the laser beam is not deflected. Integrated into the emergent surface 11 are beam-shaping optics that shape the laser beam 18 in the propagation plane 19.

The angle α of the reflecting surface 15 is selected such that the primary laser beam 6 is deflected by the optical system 2 through 90° and the propagation plane 19 of the ring-shaped laser beam 18, 20 extends perpendicular to the propagation direction 16 of the primary laser beam 6. The laser beam 20 is coupled out from the housing 3 through an output window 21 and impinges as coupled-out laser beam 22 on a wall, ceiling or other target object and may be used as a laser mark.

The visibility of the laser beam on a target object depends, among other things, on the intensity of the laser beam. It is therefore useful to adapt the opening angle of the laser beam to the measuring task, in order to utilize the available intensity. The opening angle of the coupled-out laser beam 22 can be adjusted over the range that the laser beam 17 illuminates on the reflecting surface 15. The opening angle of the coupled-out laser beam 22 is adjustable by displacing the optical axis of the primary laser beam 6 and/or of the cylinder axis 12 of the circular cylinder 7. An adjustment device 23 is provided for this purpose, whereby the position of the beam source 5 is adjustable in the propagation direction 16 of the primary laser beam 6 and/or in a plane perpendicular to the propagation direction 16. Alternatively or additionally, a further adjustment device 24 is provided, whereby the optical system 2 is adjustable in the propagation direction 16 and/or in the plane perpendicular to the propagation direction 16.

Figure 2A:
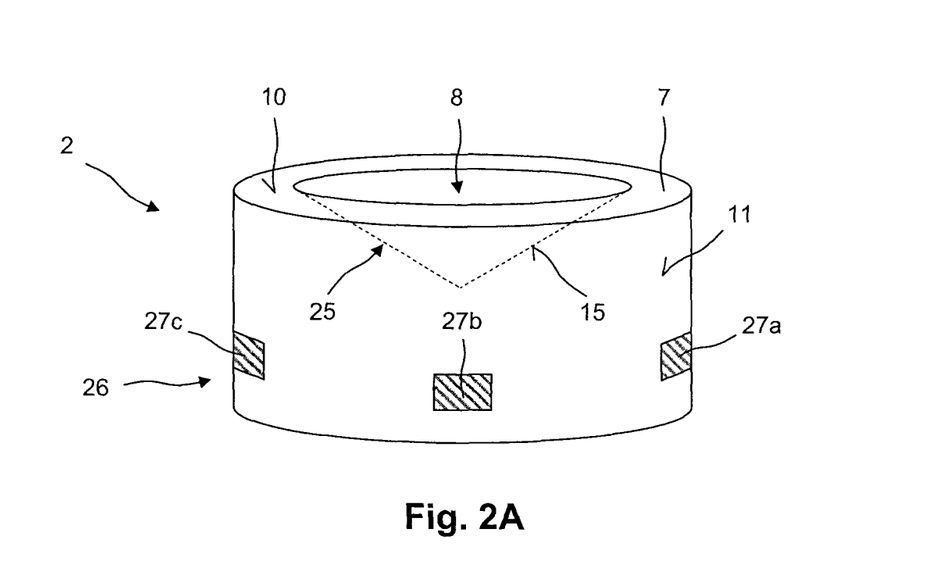
FIGS. 2A and 2B show the optical system according to the invention of FIG. 1 having four diffractive optical elements that are integrated into the lateral surface of the base member, in a three-dimensional view (FIG. 2A) and in a section perpendicular to the cylinder axis of the base member (FIG. 2B)
Figure 2B:
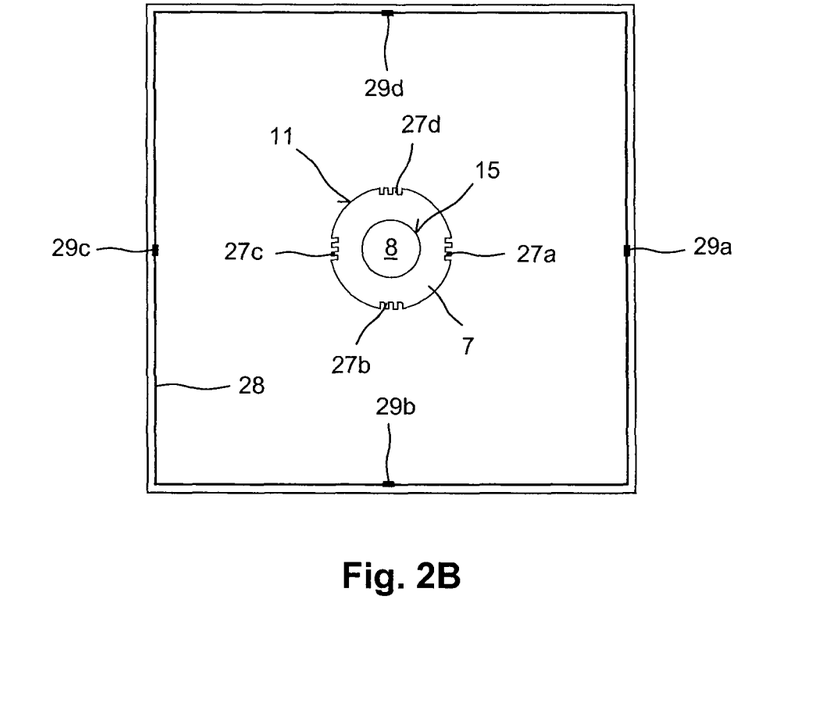

FIGS. 2A, 2B show the optical system 2 of FIG. 1 in a three-dimensional view (FIG. 2A) and in a section perpendicular to the cylinder axis 12 of the base member 7 (FIG. 2B).

The optical system 2 comprises a first optical element 25 that is designed as a reflecting surface 15 and produces the ring-shaped laser beam 18, and beam-shaping optics 26 that shape the ring-shaped laser beam 18 at least in some segments thereof in a plane parallel to the propagation plane 19. The beam-shaping optics 26 are integrated into the lateral surface 11 of the base member 7 and are designed in the form of four micro-structured surfaces 27a-27d. The term "integrated" means that no interface exists between the base member 7 and the beam-shaping optics 26.

The micro-structured surfaces 27a-27b are designed in such a way that the zero order of diffraction of the laser beam 18 generates a line-shaped laser mark 28 on a target surface and the higher orders of diffraction, in particular the first order of diffraction, generate spot-shaped laser marks 29a-29d. Microstructured surfaces are known also by the term "diffractive optical elements." They act like an optical grating and split an incident laser beam into different orders of diffraction, according to the angle. Diffractive optical elements have the advantage that they allow laser beams to be shaped into nearly any desired beam distribution. Diffractive optical elements are produced by photolithographic production methods and by scanning patterning methods, such as diamond turning and laser- or electron-beam writing.

Figure 3A:
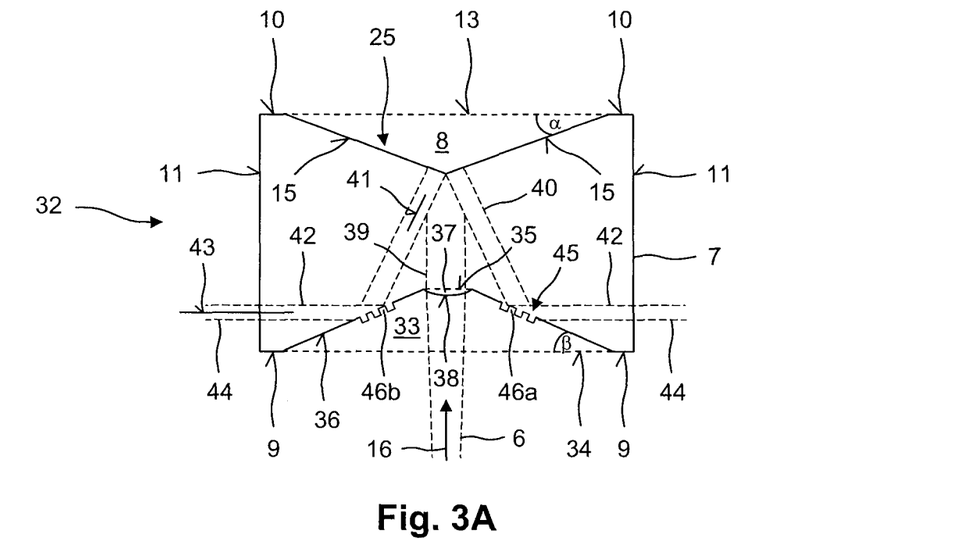
FIGS. 3A and 3B show a second embodiment of an optical system according to the invention, comprising a cylindrical base member having a first cone-shaped cutout portion in the upper base and a second truncated-cone-shaped cutout portion in the lower base of the base member, two diffractive optical elements being integrated in the lateral surface of the second cutout portion, in a section parallel (FIG. 3A) and a section perpendicular to the cylindrical axis of the base member (FIG. 3B)
Figure 3B:
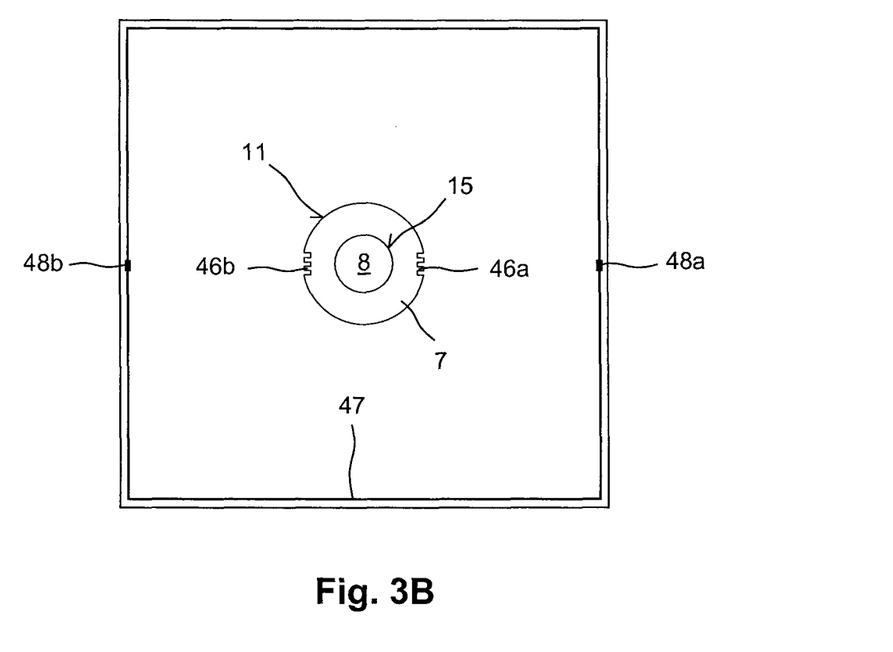

FIGS. 3A, 3B show a second embodiment of an optical system 32 according to the invention that is designed as a base member in the form of the right circular cylinder 7 that has the first cone-shaped cutout portion 8 and a second truncated-cone-shaped cutout portion 33. FIG. 3A shows a section through the optical system 32 parallel to the cylinder axis 12 and FIG. 3B shows a section perpendicular to the cylinder axis 12 of the base member 7.

The circular cylinder 7 comprises the circular lower base 9, the circular upper base 10 that is parallel to the lower base 9, and the lateral surface 11 which is designed for the laser beam as a transmitting surface in the form of an emergent surface. The surface area of the first cone-shaped cutout portion 8 comprises the circular base 13, which is arranged in the upper base 10 of the base member 7, and the lateral surface 15 that abuts the base 13 and which is designed as the first reflecting surface for the laser beam. The surface area of the second truncated-cone-shaped cutout portion 33 comprises a circular lower base 34 which is arranged in the lower base 9 of the base member 7, a circular upper base 35 which is parallel to the lower base 34 and which is designed for the laser beam as a transmitting surface, and a lateral surface 36 which is arranged at an angle β to the lower base 34 and which is designed as a second reflecting surface for the laser beam.

The optical system 32 has a further optical element 37 that is designed as collimating optics and directly abuts the upper base 35 of the second truncated-cone-shaped cutout portion 33. The term "directly abutting" means that the base member 7 and the collimating optics 37 have a common interface, and no other optical element or medium having a differing refractive index, such as air for example, is located between the optical surfaces of the two optical elements 7, 37. The collimating optics 37 are designed as an aspherically curved lens, and the surface of the collimating optics 37 that faces away from the upper base 35 forms a transmitting surface for the laser beam 6 in the form of a curved incident surface 38. Alternatively, the collimating optics 37 may be integrated into the base member 7 and produced monolithically from one material. Suitable materials for the base member 7 are, for example, glass and plastics. The aspheric curvature is created in glass for example by diamond turning, replicating, grinding and polishing, or by pressing at high temperatures from a glass blank, and in the case of plastic by injection molding or injection compression molding.

The primary laser beam 6 impinges on the incident surface 38 that allows the transmitted fraction of the laser beam 6 to pass through and reshapes into a collimated laser beam 39. The collimated laser beam 39 impinges on the first reflecting surface 15 that deflects the reflected fraction and reshapes it into an at least segmentally ring-shaped laser beam 40. The laser beam 40 propagates in a propagation plane 41 and impinges on the second reflecting surface 36 that deflects the reflected fraction as a double-reflected laser beam 42 in the direction toward the emergent surface 11. The laser beam 42 propagates in a propagation plane 43 and impinges on the emergent surface 11, through which the transmitted fraction passes as transmitted laser beam 44. The angle α of the first reflecting surface 15 and the angle β of the second reflecting surface 36 are aligned relative to one another in such a way that the primary laser beam 6 is deflected by the optical system 32 through 90° and the propagation plane 43 of the ring-shaped laser beam 42 extends perpendicular to the propagation direction 16 of the primary laser beam 6. At the emergent surface 11 the laser beam 42 is not deflected and continues to propagate in the propagation plane 43.

The optical system 32 comprises the first optical element 25 which is designed as a reflecting surface 15 and produces the ring-shaped laser beam 40, and beam shaping optics 45 that shape the ring-shaped laser beam 40, 42 at least in some segments thereof in a plane parallel to the propagation plane 41, 43. The beam shaping optics 45 are integrated into the lateral surface 36 of the second cutout portion 33 and designed in the form of diffractive optical elements 46a, 46b. The diffractive optical elements 46a, 46b are designed in such a way that the zero order of diffraction of the laser beam generates part of a line-shaped laser mark 47 on a target surface and the higher orders of diffraction, in particular the first order of diffraction, generate spot-shaped laser marks 48a, 48b. The spot-shaped laser marks are arranged at an angle of 180° to one another and may be used to transfer an angle of 180° from one target surface onto another target surface. The angle between the diffractive optical elements may be selected as desired, the angles that are most commonly transferred are 90° and 180°.

Figure 4A:
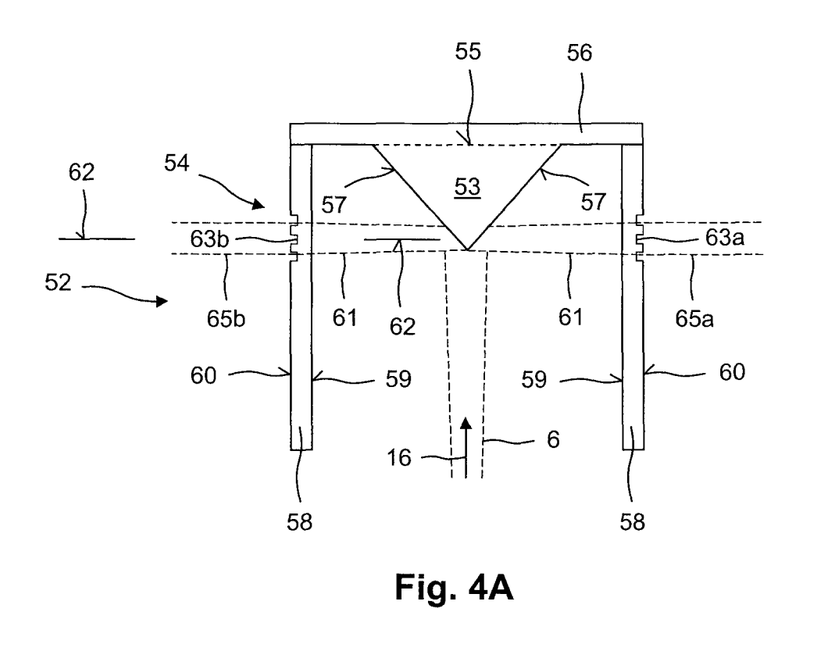
FIGS. 4A and 4B show a third embodiment of an optical system according to the invention comprising a conical mirror and a mount element, two diffractive optical elements being integrated into the mount element, in a section parallel (FIG. 4A) and a section perpendicular to the cone axis of the conical mirror (FIG. 4B)
Figure 4B:
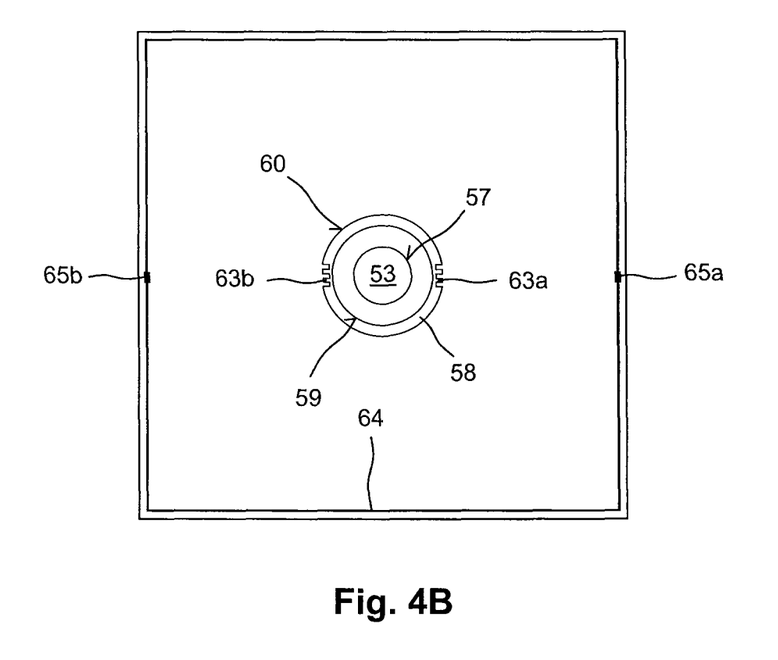

FIGS. 4A, 4B show a third embodiment of an optical system 52 according to the invention, comprising a first optical element 53 which is designed as a conical mirror, and beam shaping optics 54. FIG. 4A shows a section through the optical system 52 parallel to the cone axis and FIG. 4B a section perpendicular to the cone axis of the conical mirror 53.

The conical mirror 53 is cone-shaped, having a base 55 that is connected to an optical mount 56, and a lateral surface 57. The lateral surface 57 is designed for the laser beam 6 as a reflecting surface. The optical mount 56 is connected to a further mount element 58 which is designed in the embodiment of FIG. 1 as a hollow glass cylinder. The mount element 58 has a first and second interface 59, 60 which are designed as transmitting surfaces for the laser beam. The first interface 59 is referred to as the incident surface and the second interface 60 as the emergent surface for the laser beam.

The primary laser beam 6 emitted from the beam source 5 impinges on the linear surface 57 which deflects the reflected fraction of the laser beam and reshapes it into a ring-shaped laser beam 61 that propagates in a propagation plane 62. The ring-shaped laser beam 61 impinges on the mount element 58. The transmitted fraction of the laser beam 61 passes through the incident surface 59 into the mount element 58 and propagates through the mount element 58 in the direction of the emergent surface 60. At the incident and emergent surfaces 59, 60, the laser beam 61 is not deflected and continues to propagate in the propagation plane 62.

The beam shaping optics 54 are designed in the form of a first and second diffractive optical element 63a, 63b and integrated into the emergent surface 60 of the mount element 58. The diffractive optical elements 63a, 63b are designed in such a way that the zero order of diffraction of the laser beam generates part of a line-shaped laser mark 64 on a target surface and the higher orders of diffraction generate spot-shaped laser marks 65a, 65b.

In order to generate on a target area a line-shaped laser mark that is closed over 360°, all bounded surfaces in which the directional derivative of the bounding line is continuous may be used as suitable base members. If the directional derivative is not continuous at any point, the ring-shaped laser beam is interrupted and the line-shaped laser mark on a target surface is therefore not closed over the entire circumference of the mark. In applications in which a closed laser mark is not required, it is possible to use bases in which the directional derivative of the bounding line is not continuous at one or at multiple points, like in a polygonal lower base, in which the directional derivative of the bounding line is continuous in the area of the sides and not continuous in the area of the corner points.

Figure 5A:
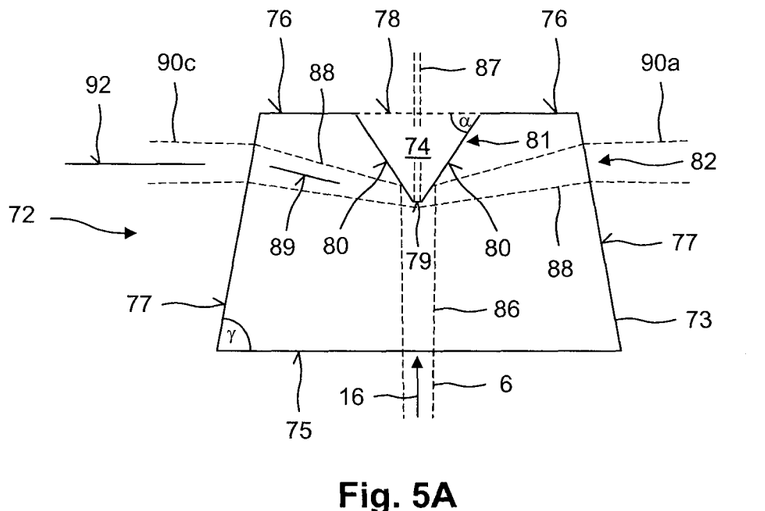
FIGS. 5A and 5B show a fourth embodiment of an optical system according to the invention comprising a truncated-pyramid-shaped base member having a quadratic lower base and a truncated-cone-shaped cutout portion in the upper base of the base member, four planar optical elements being integrated into the lateral surface of the base member, in a section parallel to the pyramid axis (FIG. 5A) and in a section perpendicular to the pyramid axis of the base member (FIG. 5B)
Figure 5B:
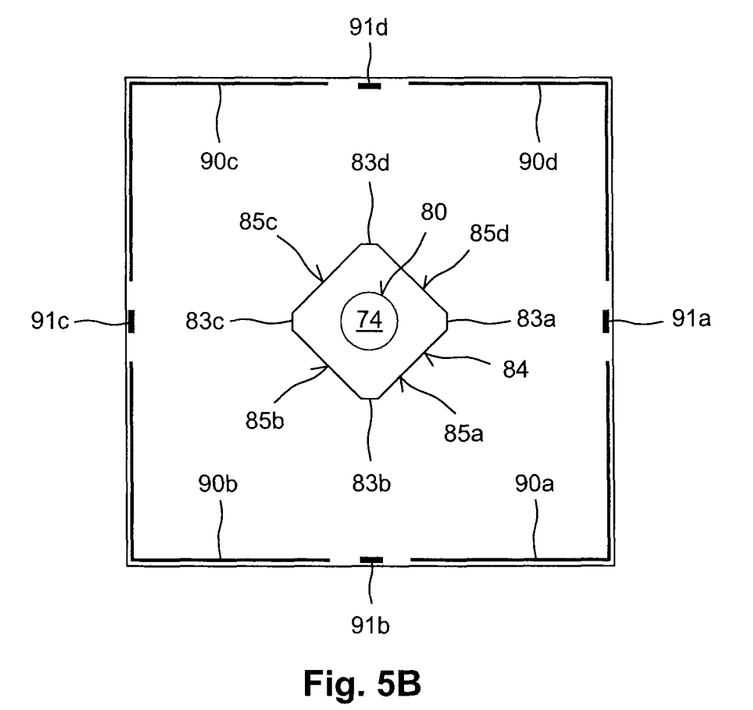

FIGS. 5A, 5B show a fourth embodiment of an optical system 72 according to the invention which is designed as a base member in the form of a truncated pyramid 73 that has a truncated-cone-shaped cutout portion 74. The section in FIG. 5A shows a section through the optical system 72 parallel to the pyramid axis, and FIG. 5B a section perpendicular to the pyramid axis of the base member 73. A pyramid is a special cone that has a polygonal lower base and the same definitions apply as for a cone.

The truncated pyramid 73 comprises a quadratic lower base 75, a quadratic upper base 76 parallel to the lower base 75, and a lateral surface 77 abutting the lower and upper bases 75, 76 which is arranged at an angle Y to the lower base 75. The lower base 75 and the lateral surface 77 are designed for the laser beam as transmitting surfaces in the form of an incident surface and an emergent surface, respectively. The surface area of the cutout portion 74 comprises a lower base 78 which is arranged in the upper base 76 of the base member 73, an upper base 79 which is designed as a transmitting surface for the laser beam, and a lateral surface 80 abutting the lower and upper bases 78, 79, which is designed as a reflecting surface for the laser beam. The lateral surface 80 forms a first optical element 81.

The optical system 72 has beam shaping optics 82 in the lateral surface 77 that comprise four optical elements 83a-83d that are ground flat. An emergent surface 84 for the laser beam from the optical system 72 comprises the four optical elements 83a-83d and four lateral surfaces 85a-85d of the truncated pyramid 73.

The divergent laser beam 6 impinges on the incident surface 75, through which the transmitted fraction passes as transmitted laser beam 86. The transmitted laser beam 86 propagates through the base member 73 and impinges with one part on the upper base 78 which is designed as a transmitting surface and allows the transmitted fraction to pass through in the form of a spot-shaped plumb beam 87, and with another part on the reflecting surface 80 which deflects the reflected fraction and reshapes it into a ring-shaped laser beam 88. The ring-shaped laser beam 88 propagates in a propagation plane 89 and impinges on the emergent surface 84 that has the four optical elements 83a-83d and the four lateral surfaces 85a-85d.

The ring-shaped laser beam 88 is divided at the emergent surface 84 into four line-shaped laser beams 90a-90d and four spot-shaped laser beams 91a-91d and deflected according to the angle of incidence. The angle α of the reflecting surface 80 and the angle Y of the lateral surface 77 are aligned relative to one another in such a way that the primary laser beam 6 is deflected by the optical system 72 through 90°, and a propagation plane 92 of the line-shaped and spot-shaped laser beams extends perpendicular to the propagation direction 16 of the primary laser beam 6. The lateral surfaces 85a-85d generate on a target surface the respective line-shaped laser beams 90a-90d and the optical elements 83a-83d generate the respective spot-shaped laser beams 91a-91d.

The spot-shaped laser beams 91a-91d can be collimated or focused by beam-shaping optics. These beam-shaping optics can be integrated into the ground optical elements 83a-83d via a curved incident surface.

Figure 6A:
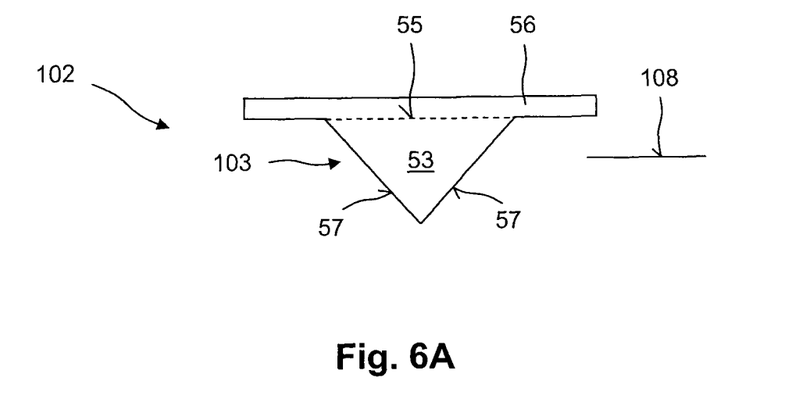
FIGS. 6A and 6B show a fifth embodiment of an optical system according to the invention, comprising the conical mirror of FIGS. 4A and 4B, two diffractive optical elements and two optical elements that are ground flat being integrated into the lateral surface of the conical mirror, in a section parallel to the cone axis (FIG. 6A) and a section perpendicular to the cone axis of the conical mirror (FIG. 6B)
Figure 6B:
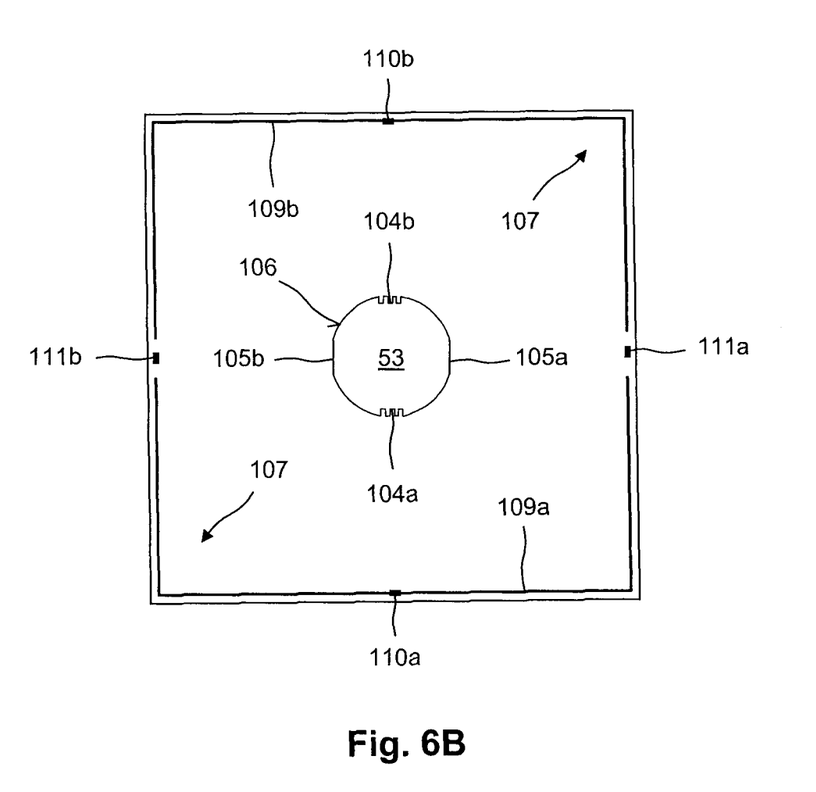

FIGS. 6A, 6B show a fifth embodiment of an optical system 102 according to the invention, comprising the first optical element 53 which is designed as a conical mirror, and beam shaping optics 103. FIG. 6A shows a section through the optical system parallel to the cone axis and FIG. 6B a section perpendicular to the cone axis of the conical mirror 53.

The conical mirror 53 comprises the base 55 which is connected to the optical mount 56 and the lateral surface 57 which is designed at least in some segments thereof as a reflecting surface for the laser beam 6. The beam shaping optics 103 are integrated into the lateral surface 57 of the conical mirror 53 and comprise two diffractive optical elements 104a, 104b and two optical elements 105a, 105b that are ground flat. The lateral surface 57 that has the optical elements 104a, 104b, 105a, 105b forms a reflecting surface 106 for the laser beam.

The primary laser beam 6 impinges on the reflecting surface 106 which deflects the reflected fraction of the laser beam 6 and reshapes it into a laser beam bundle 107 that propagates in a propagation plane 108. The laser beam bundle 107 comprises a first and a second ring beam 109a, 109b and four spot-shaped laser beams 110a, 110b, 111a, 111b. The diffractive optical elements 104a, 104b generate from the zero order of diffraction of the laser beam part of the ring beams 109a, 109b and from the higher orders of diffraction the spot-shaped laser beams 110a, 110b. The ground optical elements 105a, 105b generate the spot-shaped laser beams 111a, 111b. The spot-shaped laser beams 111a, 111b may be collimated or focused by beam-shaping optics. These beam-shaping optics can be integrated into the ground optical elements 105a, 105b via a curved incident surface.

The first optical element 53 and the beam shaping optics 103 are designed to be monolithic and the optical elements 104a, 104b, 105a, 105b are integrated into the lateral surface 57 of the conical mirror 53. Alternatively, the conical mirror may be assembled of a plurality of segments that directly abut one another. The segments are selected such that they have the desired beam-shaping properties, that is to say, a first segment is designed, for example, in the form of a cone segment and generates a laser beam that is ring-shaped at least in some segments thereof, and a second segment is ground flat, for example, and generates a spot-shaped laser beam.

Figure 7:
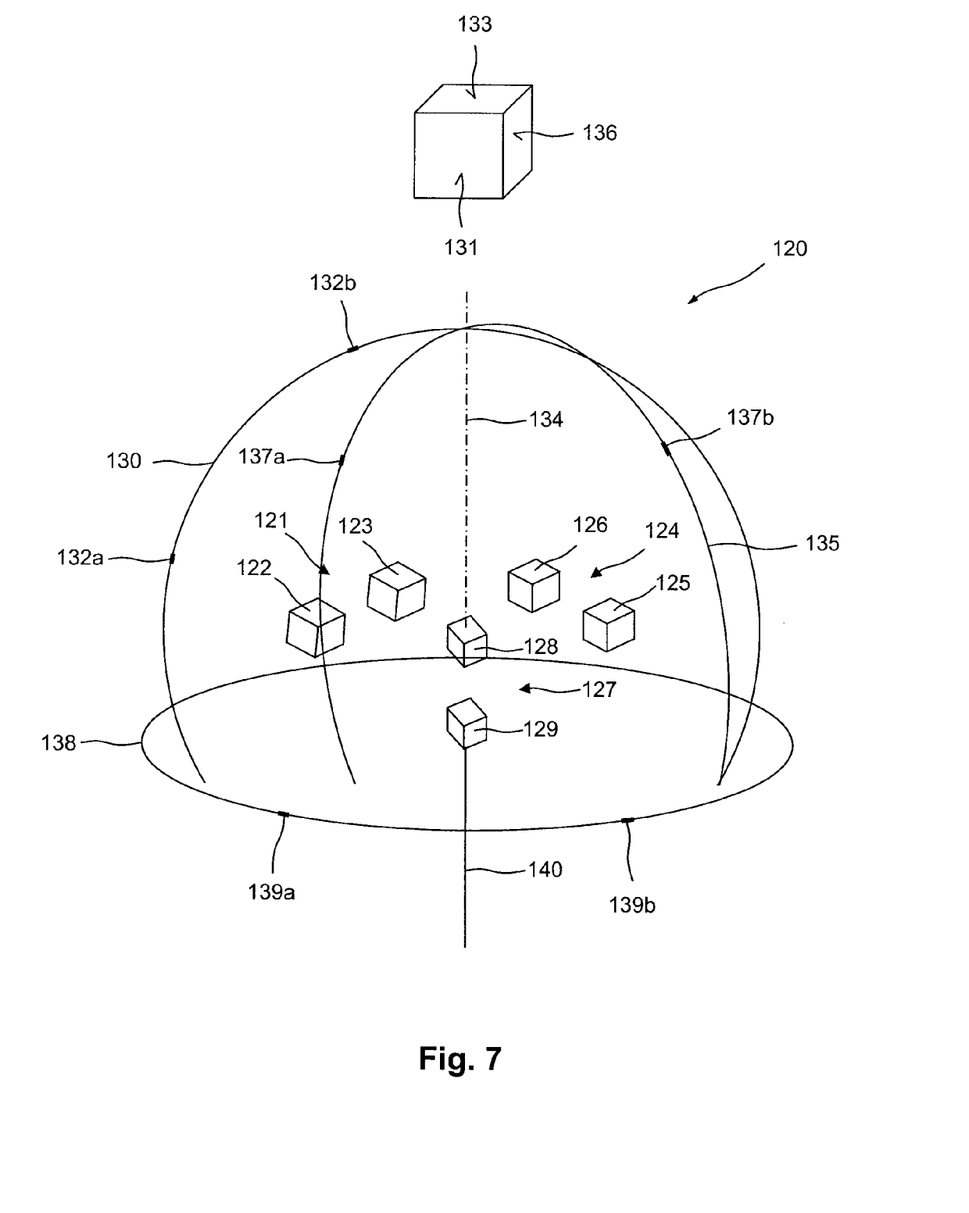
FIG. 7 shows a laser system comprising a first, second and third optical system that produce three line-shaped laser beams that are arranged perpendicular to each other and one spot-shaped laser beam.

FIG. 7 shows a laser system 120 according to the invention, comprising a first beam device 121 having a first beam source 122 and a first optical system 123 according to the invention, a second beam device 124 having a second beam source 125 and a second optical system 126 according to the invention and a third beam device 127 having a third beam source 128 and a third optical system 129 according to the invention. The optical systems 123, 126, 129 according to the invention correspond to one of optical systems 2, 32, 52, 72, 102 and each generate in the propagation plane a ring-shaped laser beam that is referred to as a ring beam, and two spot-shaped laser beams that are referred to as spot beams.

The first beam device 121 generates a first ring beam 130 which is arranged in a first vertical plane 131 and which is referred to as the first vertical ring beam, and two vertical spot beams 132a, 132b which are likewise arranged in the first vertical plane 131. The first vertical plane 131 is perpendicular to a horizontal plane 133. The orientation of the horizontal plane 133 is defined by a vertical direction 134 that is determined by the force of gravity.

The second beam device 124 generates a second ring beam 135 which is arranged in a second vertical plane 136 and which is referred to as the second vertical ring beam, and two vertical spot beams 137a, 137b which are likewise arranged in the second vertical plane 136. The second vertical plane 136 is arranged perpendicular to the horizontal plane 133 and perpendicular to the first vertical plane 131.

The third beam device 127 generates a third ring beam 138 which is arranged in the horizontal plane 133 and which is referred to as a horizontal ring beam, and two horizontal spot beams 139a, 139b which are likewise arranged in the horizontal plane 133. The horizontal ring beam 138 extends perpendicular to the first and second vertical ring beams 130, 135. The third beam device 127 generates, in addition to the ring beam 138 and the spot beams 139a, 139b, a spot-shaped plumb beam 140 that is oriented opposite to the vertical direction 134 and lies on the intersecting line of the two vertical ring beams 130, 135. The plumb beam 140 may alternatively also be generated by an additional beam source.

As an alternative to the laser system 120 having three beam sources 122, 125, 128, it is possible for the laser system to have a single beam source. In this case the laser beam is divided into partial beams by beam splitters. A laser system having a single beam source is advantageous if the beam source provides sufficient power to make the ring beams visible on the substrate. A laser system having a single beam source can be designed to be more compact than a laser system in which three beam sources are arranged.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An optical system for shaping a laser beam, comprising:
a first optical element including a lateral surface, wherein the lateral surface includes a reflecting surface for the laser beam and wherein the laser beam is re-shapeable in at least in some sections thereof into a ring-shaped laser beam that is propagatable in a propagation plane by the lateral surface; and
a second optical element, wherein the ring-shaped laser beam is shapeable at least in some segments thereof in a plane parallel to the propagation plane by the second optical element.

2. The optical system according to claim 1, wherein the second optical element is integrated into the lateral surface of the first optical element or directly abuts the lateral surface.

3. The optical system according to claim 1, wherein the second optical element includes a lateral surface and wherein the lateral surface of the second optical element abuts the lateral surface of the first optical element.

4. The optical system according to claim 1, further comprising a third optical element including an interface, wherein the second optical element is integrated into the interface or directly abuts the interface.

5. The optical system according to claim 1, further comprising a third optical element integrated into an interface or directly abutting an interface.

6. The optical system according to claim 1, wherein the second optical element is a diffractive optical element.

7. The optical system according to claim 1, wherein the second optical element is a ground optical element.

8. The optical system according to claim 1, wherein the first optical element includes a base member with a lower base, an upper base, and a lateral surface abutting the lower base and the upper base, wherein the lower base and the lateral surface include a transmitting surface for the laser beam, and wherein the base member includes a first cutout portion with a base arranged in the upper base of the base member.

9. The optical system according to claim 8, wherein the base member includes a second cutout portion including a lower base arranged in the lower base of the base member, an upper base including a transmitting surface for the laser beam, and a lateral surface abutting the lower base and the upper base of the second cutout portion, wherein the lateral surface includes a second reflecting surface for the laser beam.

10. The optical system according to claim 8, wherein the first cutout portion includes an upper base parallel to the base of the first cutout portion, wherein the upper base includes a transmitting surface for the laser beam.

11. A laser system, comprising:
a beam source, wherein a laser beam is generatable by the beam source; and
an optical system according to claim 1.

12. The laser system according to claim 11, further comprising an adjustment device, wherein a position of the beam source relative to the optical system and/or a position of the optical system relative to the beam source is adjustable in a propagation direction of the laser beam and/or in a plane perpendicular to the propagation direction of the laser beam by the adjustment device.

13. The laser system according to claim 11, further comprising a second optical system, wherein a segmentally ring-shaped laser beam and a spot-shaped laser beam are generatable by the second optical system, and a third optical system, wherein a segmentally ring-shaped laser beam and a spot-shaped laser beam are generatable by the third optical system.

14. An optical system for shaping a laser beam, comprising:
- a first optical element including a lateral surface, wherein the lateral surface includes a reflecting surface for the laser beam and wherein the laser beam is re-shapeable in at least in some sections thereof into a ring-shaped laser beam by the lateral surface; and
- a second optical element, wherein the ring-shaped laser beam is shapeable at least in some segments thereof in a plane parallel to a propagation plane of the ring-shaped laser beam by the second optical element.

* * * * *